M. STONE.
HARVESTER GUARD-FINGER.
No. 173,081. Patented Feb. 1, 1876.
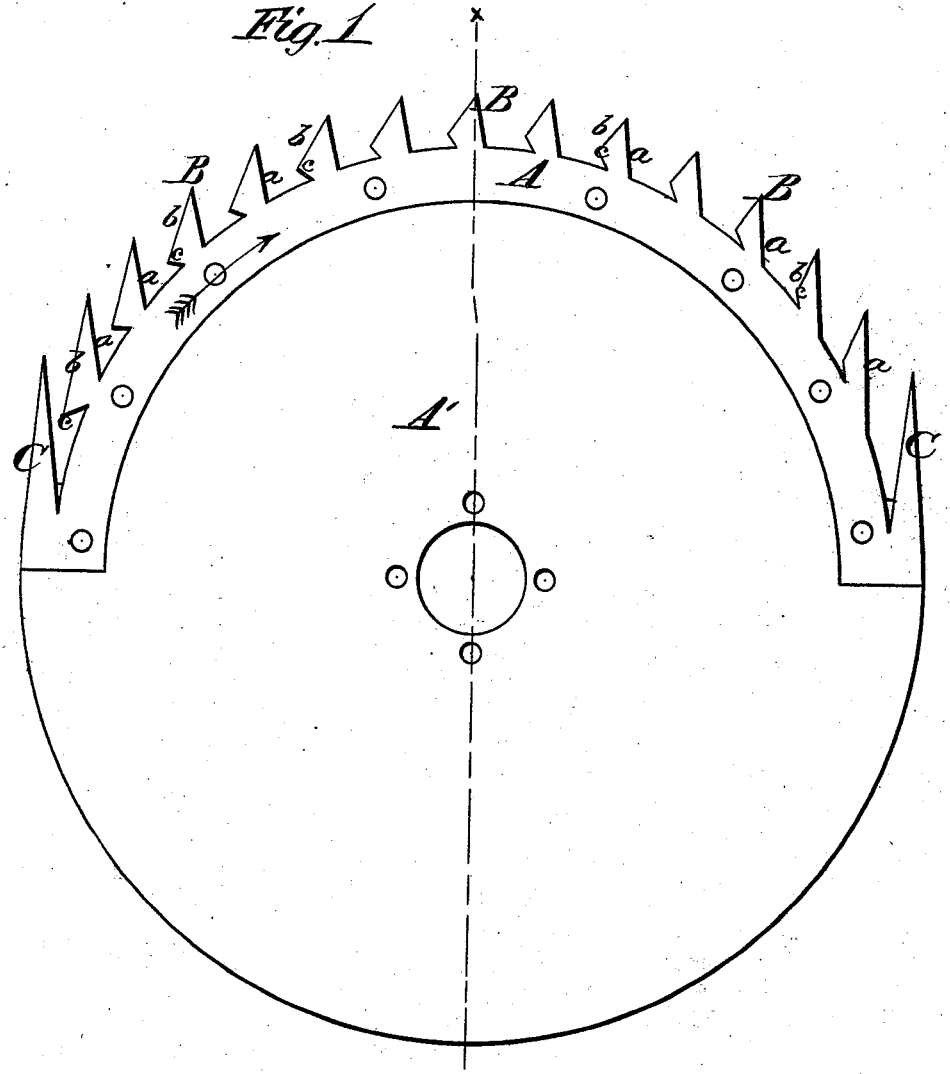
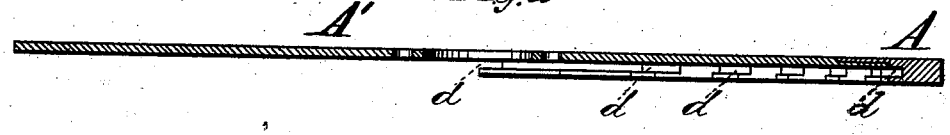
WITNESSES
INVENTOR
Melvin Stone,
ATTORNEYS

UNITED STATES PATENT OFFICE.

MELVIN STONE, OF BERLIN HEIGHTS, OHIO.

IMPROVEMENT IN HARVESTER GUARD-FINGERS.

Specification forming part of Letters Patent No. 173,081, dated February 1, 1876; application filed August 21, 1875.

*To all whom it may concern:*

Be it known that I, MELVIN STONE, of Berlin Heights, in the county of Erie and State of Ohio, have invented a new and valuable Improvement in Finger-Plates; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my finger-bar, and Fig. 2 is a vertical central sectional view of the same.

This invention has relation to the cutting apparatus of reapers and mowers; and the nature of my invention consists in a semicircular finger-bar, provided with fingers having their outer edges oblique to the line of draft, and forming an acute angle with each other, and having angular notches near their inner ends, to catch and hold the grass or grain to be cut between said notches and the revolving knives of the sickle, as will be hereinafter explained.

In the annexed drawings, A designates a semicircular finger-bar, attached to a circular grain-table, A'. The fingers B, which are formed on this bar, are of angular form, terminating in sharp points, and their upper surfaces are in the same plane with the corresponding surface of the platform. The edges $a$ of the fingers B are straight and oblique to the line of draft, and the edges $b$ are also straight, make an acute angle with the edges $a$, and are inclined to the line of draft. $c\ c$ are the upper edges of angular notches made in the inner ends of the fingers, between which notches and the revolving knives, rotating from left to right, as seen in Fig. 1, the grain or grass is grasped and prevented from slipping in the operation of cutting. In the working machine these notches are preferably made from two and a half to three inches in depth in the fingers. These fingers B are thicker, vertically, than the finger-bar, and they have slots $d$ formed horizontally in their rear ends, which slots are in the same plane as the bottom side of the finger-bar, for the purpose of receiving the edge of a rotating sickle, which will be secured to a suitable wheel beneath the platform. At the sides of the platform are long dividing-teeth C, which are considerably longer and more acute than the fingers B. These dividing-teeth, like the teeth B, have slots in their rear ends to receive the edge of the rotating sickle. The finger-bar A will, in practice, be made separate from the platform and secured to it by bolts.

What I claim as new, and desire to secure by Letters Patent, is—

The semicircular finger-bar A, provided with fingers, the edges $a\ b$ of which are oblique to the line of draft, and make an acute angle with each other, and having angular notches at their bases to hold the grass or grain, and provided with slots $d$, substantially as described.

In testimony that I claim the above I have hereunto subscribed my name in the presence of two witnesses.

MELVIN STONE.

Witnesses:
MARY P. STONE,
B. A. HICKS.